IMAGING SYSTEM

Filed Dec. 21, 1967

INVENTOR.
JAMES J. KNIESER
BY David C. Petre
James J. Ralabate
ATTORNEYS

United States Patent Office 3,795,512

Patented Mar. 5, 1974

3,795,512

IMAGING SYSTEM

James J. Knieser, 1225 Wall Road, Webster, N.Y. 14580

Filed Dec. 21, 1967, Ser. No. 692,336
Int. Cl. G03g 13/22
U.S. Cl. 96—1 R 24 Claims

ABSTRACT OF THE DISCLOSURE

A positive to positive (negative to negative) imaging system, the imaging member generally comprising, in its simplest form, photosensitive fracturable material contained in a softenable, electrically insulating layer on a substrate, the process steps generally comprising in a preferred embodiment, uniform charging with a charge of a first polarity; imagewise exposure; uniform charging with a charge of a polarity opposite said first polarity; and uniform exposure to form the latent image which may then be developed to cause imagewise migration of fracturable material.

BACKGROUND OF THE INVENTION

This invention relates in general to imaging, and more specifically to a new positive to positive migration imaging system.

There has recently been developed a migration imaging system capable of producing high quality images of high density, continuous tone, and high resolution, an embodiment of which is described in copending application Ser. No. 460,377, filed June 1, 1965, now U.S. Pat. 3,520,681. Generally, according to an embodiment thereof, an imaging member comprising a conducting substrate with a layer of softenable (herein also intended to include soluble) material, containing photosensitive particles overlying the conductive substrate is imaged in the following manner: a latent image is formed on the member, for example, by uniformly electrostatically charging and exposing it to a pattern of activating electromagnetic radiation. The imaging member is then developed by exposing it to a solvent which dissolves only the softenable layer. The photosensitive particles which have been exposed to radiation migrate through the softenable layer as it is softened and dissolved, leaving an image of migrated particles corresponding to the radiation pattern of an original, on the conductive substrate. The image may then be fixed to the substrate. For many preferred photosensitive particles the image produced by the above process is a negative of a positive original, i.e., the exposed areas of fracturable material are the portions that develop out. Those portions of the photosensitive material which do not migrate to the conductive substrate may be washed away by the solvent with the softenable layer. As disclosed therein, by other developing techniques, the softenable layer may at least partially remain behind on the supporting substrate.

In general, three basic imaging members may be used: a layered configuration which comprises a substrate coated with a layer of softenable material, and a fracturable and preferably particulate layer of photosensitive material at or embedded near the upper surface of the softenable layer; a binder structure in which the photosensitive particles are dispersed in the softenable layer which overcoats a substrate; and an overcoated structure in which a substrate is overcoated with a layer of softenable material followed by an overlayering of photosensitive particles and a second overcoating of softenable material which sandwiches the photosensitive particles. Fracturable layer or material as used herein, is intended to mean any layer or material which is capable of breaking up into discrete particles of the size of an image element or less during development and permitting portions to migrate towards the substrate in image configuration.

This imaging system generally comprises a combination of process steps which includes forming a latent image and developing with solvent liquid or vapor, or heat or combinations thereof to render the latent image visible. In certain methods of forming the latent image nonphotosensitive or inert, fracturable and particulate layers and material may be used to form images, as described in copending application Ser. No. 483,675, filed Aug. 30, 1965, now U.S. Pat. 3,656,990, wherein a latent image is formed by a wide variety of methods including charging in image configuration through the use of a mask or stencil; first forming such a charge pattern on a separate photoconductive insulating layer according to conventional xerographic reproduction techniques and then transferring this charge pattern to the members hereof by bringing the two layers into very close proximity and utilizing breakdown techniques as described, for example, in Carlson Pat. 2,982,647 and Walkup Pats. 2,825,814 and 2,937,943. In addition, charge patterns conforming to selected, shaped, electrodes or combinations of electrodes may be formed by the "TESI" discharge technique as more fully described in Schwertz Pats. 3,023,731 and 2,919,967 or by techniques described in Walkup Pats. 3,001,848 and 3,001,849 as well as by electron beam recording techniques, for example, as described in Glenn Pat. 3,113,179.

In another variation of this imaging system an image is formed by the selective disruption of a particulate material overlying or in an electrostatically deformable, or wrinklable film or layer. This variation differs from the system described above in that the softenable layer is deformed in conjunction with a disruption of the particulate material as described more fully in application Ser. No. 520,423, filed Jan. 13, 1966, now abandoned.

The characteristics of the images produced by this new system are dependent on such process steps as charging, exposure and development, as well as the particular combination of process steps. High density, continuous tone and high resolution are some of the image characteristics possible. The image is generally characterized as a fixed or unfixed particulate image with or without a portion of the softenable layer and unmigrated portions of the fracturable layer left on the imaged member, which can be used in a number of applications such as microfilm, hard copy, optical masks, and strip out applications using adhesive materials.

For some preferred photosensitive materials a positive to negative imaging system results (the photosensitive particles migrate in the exposed areas) when an imaging member is uniformly charged, imagewise exposed and developed. In many imaging applications, it is desirable to produce positive images from a positive original and negatives from a negative original (the photosensitive particles migrate in the imagewise unexposed areas).

To this desirable end, there are a number of copending applications describing advantageous positive to positive migration imaging systems.

Copending application Ser. No. 642,828, filed June 1, 19677 describes a positive to positive migration imaging system with the steps of uniform charging, uniform exposure and imagewise exposure while the softenable layer is soft; to form a migration image.

Copending application Ser. No. 658,783, filed Aug. 7, 1967 describes a positive to positive migration imaging system with the steps of uniform charging, imagewise exposure, uniform softening of the softenable layer and uniform exposure to produce the latent image which is developed to migrate particles and render the latent image visible by softening or dissolving away the softenable layer.

While advantageous, the system of 642,828 described imagewise exposure while the softenable layer is soft which may require rather exact control of material condition and timing, which may require complex, expensive apparatus. Likewise, the system of 658,783 requires a predevelopment softening of the softenable layer which may be difficult to control in a commercially desirable, simple inexpensive machine.

Thus, there is a continuing need for a simple, inexpensive and reliable system for producing positive migration images from a positive optical image original (and negative migration images from a negative original) utilizing the migration imaging system and members described and referenced herein.

SUMMARY OF THE INVENTION

It is, therefore, an object of this invention to provide a positive to positive migration imaging system which overcomes the above noted disadvantages and satisfies the above noted wants.

It is a further object of this invention to provide a positive to positive imaging system which does not require a softenable layer softening step to form the latent image.

It is a further object of this invention to provide a positive to positive imaging system which when coupled with prior art positive to negative techniques, may simply and reliably produce a positive to positive or positive to negative result, as desired, even simultaneously on the same imaging member by covering desired portions of the imaging member during the subsequent charging and uniform exposure steps hereof.

It is a still further object of this invention to provide a positive to positive imaging system wherein the latent image may be completely formed before development.

The foregoing objects and others are accomplished in accordance with this invention by providing an imaging member comprising in its simplest form, photosensitive fracturable material in or on a softenable, electrically insulating layer on a substrate, processed by uniformity electrostatically charging said member with a charge of a first polarity; imagewise exposing; uniformly charging with a charge of a polarity opposite said first polarity; and uniform exposure to form the latent image which may then be developed to cause imagewise migration of fracturable material.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
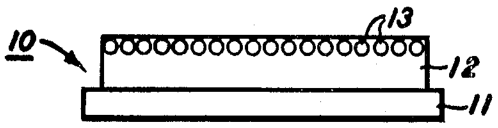
FIG. 1 is a partially schematic illustration of an embodiment of an imaging member according to the invention.

Referring now to FIG. 1, there is shown a schematic drawing of an example of one embodiment of an imaging member 10 according to this invention comprising substrate 11, electrically insulating softenable layer 12 which contains at its upper surface a fracturable layer of particulate photosensitive material 13, the size of the member exaggerated for purposes of illustration.

Substrate 11 may be electrically conductive or insulating. Conductive substrates generally facilitate the charging or sensitization of the member according to the invention and typically may be of copper, brass, nickel, zinc, chromium, stainless steel, conductive plastics and rubbers, aluminum, steel, cadmium, silver and gold. The substrate may be in any suitable form such as a metallic strip, sheet, plate, coil, cylinder, drum, endless belt, moebius strip or the like. If desired, the conductive substrate may be coated on an insulator such as paper, glass or plastic. Examples of this type of substrate are a substantially transparent tin oxide coated glass available under the trademark NESA from the Pittsburgh Plate Glass Co.; aluminized polyester film, the polyester film availabile under the trademark Mylar from the E. I. du Pont de Nemours & Co.; or Mylar coated with copper iodide.

Electrically insulating substrates may also be used which opens up a wide variety of film formable materials such as plastics for use as substrate 11.

Alternatively, the softenable layer may be self-supporting and may be brought into contact with a suitable substrate during imaging.

Softenable layer 12 may be any suitable material which is soluble or softenable in a solvent liquid or vapor or heat or combinations thereof, and in addition, is substantially electrically insulating during the latent image forming and developing steps hereof. Typical materials include Staybelite Ester 10, a partially hydrogenated rosin ester, Foral Ester, a hydrogenated rosin triester, and Neolyne 23, an alkyd resin, all from Hercules Powder Co.; SR type silicone resins available from General Electric Corporation; Sucrose Benzoate, Eastman Chemical; Velsicol X–37, a polystyrene-olefin copolymer from Velsicol Chemical Corp.; Hydrogenated Piccopale 100, a highly branched polyolefin, Piccotex 100, a styrene-vinyl toluene copolymer, Piccolastic A–75, 100 and 125, all polystyrenes, Piccodiene 2215, a polystyrene-olefin copolymer, all from Pennsylvania Industrial Chemical Corp.; Araldite 6060 and 6071, epoxy resins from Ciba; R5061A, a phenylmethyl silicone resin, from Dow Corning; Epon 1001, a bisphenol A-epichlohydrin epoxy resin, from Shell Chemical Corp.; and PS–2, PS–3, both polystyrenes, and ET–693, a phenol-formaldehyde resin, from Dow Chemical; a custom synthesized 80/20 mole percent copolymer of styrene and hexylmethacrylate, a custom synthesized polydiphenylsiloxane; a custom synthesized polyadipate; acrylic resins available under the trademark Acryloid from Rohm & Haas Co., and available under the trademark Lucite from the E. I. du Pont de Nemours & Co.; thermoplastic resins available under the trademark Pliolite from the Goodyear Tire & Rubber Co.; a chlorinated hydrocarbon available under the trademark Aroclor from Monsanto Chemical Co.; thermoplastic polyvinyl resins available under the trademark Vinylite from Union Carbide Co. and blends thereof.

The above group of materials is not intended to be limiting, but merely illustrative of materials suitable for softenable layer 12. The softenable layer may be of any suitable thickness, with thicker layers generally requiring a greater potential for charging. In general, thicknesses from about ½ to about 16 microns have been found to be preferred with a thickness from about 1 to about 4 microns being found to be optimum. If the layer is thinner than about ½ micron, excessive background may result upon liquid wash away development, while layers thicker than about 16 microns require relatively long development time resulting in lower image densities.

The material comprising layer 13, portions of which migrate to the substrate during image formation, may comprise any suitable photosensitive fracturable material. While it is preferred for images of highest resolution and density that the fracturable material be particulate, and especially, particles in a range of from about 0.02 to about 2.0 microns in size, it may comprise any continuous or semi-continuous, such as a Swiss cheese pattern, fracturable layer which is capable of breaking up during the development step and permitting portions to migrate to the substrate in image configuration.

Any suitable photosensitive fracturable material may be used herein. Typical such materials include inorganic or organic photoconductive insulating materials.

Typical inorganic photoconductors include amorphous selenium; amorphous selenium alloyed with arsenic, tellurium, antimony or bismuth, etc.; amorphous selenium or its alloys doped with halogens; cadmium sulfide, zinc oxide, cadmium sulfoselenide, cadmium yellows such as Lemon Cadmium Yellow X–2273 from Imperial Color and Chemical Dept. of Hercules Powder Co., and many others. Middleton et al., Pat. 3,121,006 lists typical inorganic photoconductive pigments. Typical organic photoconductors include azo dyes such as Watchung Red B, a barium salt of 1 - (4′ - methyl - 5′ - chloroazobenzene-2′-sulfonic acid) - 2 - hydrohydroxy - 3 - naphthoic acid, C. I. No. 15865 and quinacridones such as Monastral Red B, both available from DuPont; Indofast double scarlet toner, a Pyranthrone-type pigment available from Harmon Colors; quindo magenta RV–6803, a quinacridone-type pigment available from Harmon Colors; Cyan Blue, GTNF, the beta form of copper phthalocyanine, C. I. No. 74160, available from Collway Colors; Monolite Fast Blue GS, the alpha form of metal-free phthalocyanine, C. I. 74100, available from Arnold Hoffman Co.; commercial indigo available from National Aniline Division of Allied Chemical Corp.; yellow pigments prepared as disclosed in copending applications Ser. No. 421,281, filed Dec. 28, 1964, now U.S. Pat. 3,447,922, or as disclosed in Ser. No. 445,235, filed Apr. 2, 1965, now U.S. Pat. 3,402,177, X-form metal-free phthalocyanine prepared as disclosed in copending application Ser. No. 505,723, filed Oct. 29, 1965, now U.S. Pat. 3,357,989, quinacridonequinone from DuPont, sensitized polyvinyl carbazole, Diane Blue, 3,3′-methoxy-4,4′-diphenyl-bis (1″ azo-2″ hydroxy-3″-naphthanilide), C. I. No. 21180, available from Harmon Colors; and Algol G. C. 1,2,5,6-di (D,D′-diphenyl)-thiazole-anthraquinone, C. I. No. 67300, available from General Dyestuffs, and mixtures thereof. The above list of organic and inorganic photoconductive photosensitive materials is illustrative of typical materials, and should not be taken as a complete listing of photosensitive materials.

It is found that some photosensitive materials such as the optimum materials comprising amorphous selenium, for example, amorphous selenium or amorphous selenium alloyed with arsenic, tellurium, antimony, bismuth, etc., or amorphous selenium or an alloy thereof doped with a halogen will typically produce negative images from positive originals when uniformly charged, exposed and liquid solvent developed as described more fully in application Ser. No. 460,377, now U.S. Pat. 3,520,681. With such photoconductive materials, the system of this invention provides for a positive to positive imaging system. Other suitable photosensitive fracturable materials, such as X-form metal-free phthalocyanine, which are typically positive to negative imaging materials when charged, imagewise exposed and developed, especially in the layered configuration, may be used.

The fracturable layer for the preferred layered configuration of FIG. 1, which is found to produce optimum quality images according to this invention, may be formed by any suitable method. Typical methods include inert gas vacuum evaporation such as disclosed in application Ser. No. 423,167, filed Jan. 4, 1965, now abandoned, wherein a fracturable layer of submicron size particles of the optimum material amorphous selenium is formed on a softenable layer. The fracturable layer may be formed by other methods such as by cascading, dusting, etc., as shown in application 460,377, now U.S. Pat. 3,520,681. The thickness of the fracturable layer is generally preferably from about 0.01 to about 2.0 microns although five micron layers have been found to give good results for some materials. A more detailed description of the layered configuration imaging member may be found in copending application Ser. No. 635,256, filed May 1, 1967.

In addition to the configuration shown in FIG. 1, additional modifications in the basic structure such as the use of binder form in which the structure consists of photosensitive fracturable material dispersed in the softenable layer may also be used. In addition, an overcoated structure in which the photosensitive fracturable material is sandwiched between two layers of the softenable material which overlays a substrate is also included within the scope of this invention. When a binder structure is used, the methods set forth in Middleton Pat. 3,121,006 may be used to form the binder structure.

Figure 2:
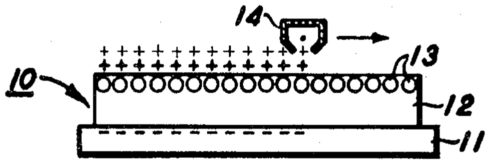
FIG. 2 is a partially schematic illustration of the electrostatic charging to a first polarity step according to the invention.

Referring now to FIG. 2, the imaging member is uniformly electrostatically charged, in the substantial absence of actinic radiation for layer 13, illustratively by means of a corona discharge device 14 which is shown to be traversing the member from left to right depositing a uniform charge, illustratively positive, on the surface of layer 13. For example, corona discharge devices of the general description and generally operated as disclosed in Vyverberg Pat. 2,836,725 and Walkup Pat. 2,777,957 have been found to be excellent sources of corona useful in the charging of member 10. Other charging techniques ranging from rubbing the member, to induction charging, for example, as described in Walkup Pat. 2,934,649 are available in the art. The surface charge potentials of layer 13, due to the initial uniform charged step hereof, preferred for imaging herein may run from a few to as high as 400 volts for layered configurations and as high as 4,000 volts for binder configurations. For positive polarity the potential should be from about 100 to 300 volts to yield optimum results. When using voltages of negative polarity, optimum results are obtained when the surface potential of layer 13 is from about 25 to about 150 volts. The polarity of charge in the first uniform electrostatic charging step hereof may be either positive or negative.

It should be noted that although the inventive steps hereof are described sequentially, the various steps may overlap. For example, the initial charging and imagewise exposure steps may overlap or may be carried out simultaneously.

Where substrate 11 is an insulating material, charging of the member, for example may be accomplished by placing the insulating substrate in contact with a conductive member and charging as illustrated in FIG. 2. Alternatively, other methods known in the art of xerography for charging xerographic plates having insulating backings may be applied. For example, where two corona charging devices on each side of the member and oppositely charged are traversed in register relative to member 10.

Figure 3:
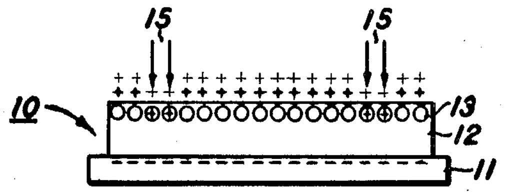
FIG. 3 is a partially schematic representation of the imagewise exposure step of this invention.

Referring now to FIG. 3, there is shown an imagewise exposure of member 10 by actinic radiation 15. Preferred exposure levels for line copying are generally found to fall between from about zero f.c.s. in non-exposed areas to from about 1 f.c.s. to about 6 f.c.s. of white light in illuminated areas to provide for optimum quality images, although greater exposures can be used. These exposure levels give maximum density, high contrast images and higher exposure levels are not found to enhance image quality, thus exposures over about 6 f.c.s. are generally thought to be unnecessary. Exposures between these two levels of about zero and from about 1 f.c.s. to about 6 f.c.s. will provide continuous tone images.

For purposes of illustration, some of the surface electrical charges deposited in FIG. 2 are depicted as having moved into particulate layer 13 in the illuminated areas. Although this representation is speculative, it is helpful for and understanding of the present invention to consider some of the electrical charges deposited in the initial charging step to be more firmly bound to layer 13 or to be injected more firmly into layer 13 in imagewise illuminated areas as a result of the imagewise exposure step illustrated in FIG. 3.

Figure 4:
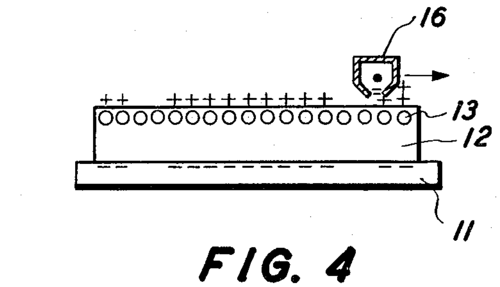
FIG. 4 is a partially schematic representation of the step of electrostatically charging with charge of a polarity opposite said first polarity.

Referring now to FIG. 4, the surface charges on member 10 are shown being reduced by subjecting the member to a negative corona discharge or generically, uniformly charging the member with a charge of a polarity opposite said first polarity. The negative corona discharge is applied as illustrated in FIG. 4 by corona discharge device 16 similar to device 14. Ionization charging (including electron charging) is preferred because of the consistency and quality of the migration images produced when ionization charging is employed in this invention. Corona discharge is a preferred mode of ionization charging because of its simplicity, relatively high charging rate and because of the uniformity of application of charge. However, any suitable source of ions ("ions" intended to include electrons) which permits the ions to be subsequently attracted to the surface of the member to charge it may be used, including radioactive sources described in Dessauer, Mott, Bogdenoff, Photo Eng. 6, 250 (1955) and short-gap, low-discharge ionization, for example, as described in the aforementioned Schwertz patents.

Preferably, in this subsequent charging step, the uniform first polarity charge is reduced to a certain low field condition and surface potential, of either polarity, which appears to be independent of the polarity and magnitude of the surface potential resulting from the initial charging step and varies with the particular photosensitive material. For example, and typically, for a photosensitive material comprising predominantly amorphous selenium in a layered configuration, a typical initial surface potential would be about 150 volts of a first polarity (either positive or negative) and the preferred surface potential after the second charging step would be about 15 to about 60 volts negative or positive polarity.

The illustratively negative recharge step appears to neutralize the initial latent image of positive charge injected into layer 13 with subsequent uniform exposure injecting charge and a migration force to the imagewise unexposed areas.

Figure 5:
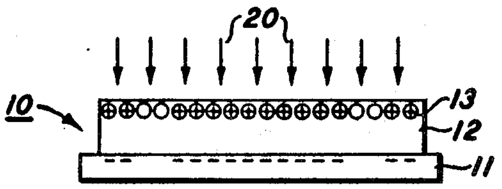
FIG. 5 is a partially schematic view of the uniform exposure step according to the invention.

Referring now to FIG. 5, there is shown a uniform exposure of member 10 by actinic radiation 20. Suitable uniform exposure levels of this invention, generally are from about 1 to 10 times those of the imagewise exposure step explained in reference to FIG. 3. This uniform exposure is preferably from about 1 f.c.s. to about 1000 f.c.s. or more to provide for optimum quality images. Any suitable actinic electromagnetic radiation may be used. Typical types include radiation from ordinary incandescent lamps, X-rays, beams of charged particles, infra red, ultra violet and so forth depending on the photosensitive material used.

For purposes of illustration, the charges on the imagewise unexposed areas of layer 13 are depicted as having moved into layer 13 as a result of the uniform exposure step, leaving the imagewise unexposed areas of layer 13 the only areas with charge still residing in the fracturable layer 13. Although this representation is speculative, it is helpful for an understanding of the present invention to consider that after the uniform exposure step hereof, electrical charges reside only in imagewise unexposed portions of layer 13, leaving only these portions with a migration force, prior to development.

It will be appreciated that although the latent imaged member is then usually developed after the uniform exposure step, to cause imagewise migration of particles and to render the latent image visible, the latent imaged member is a useful end in itself being stable for a matter of minutes and thus potentially developable.

Figure 6:
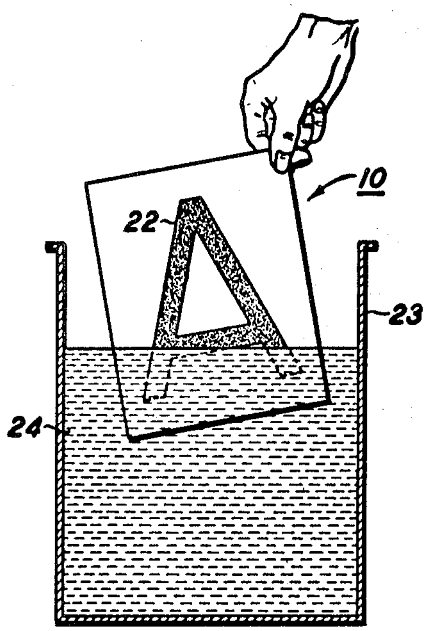
FIG. 6 is a partially schematic and perspective view of a mode of development of the latent image produced according to this invention.

Referring now to FIG. 6, the next step, typically, is to develop the latent image to render it visible, which is usually done in the absence of actinic radiation for the member, by softening or dissolving away layer 12 to permit portions of layer 13 with charges still residing therein to migrate in image configuration towards substrate 11. As illustrated, one mode of accomplishing development is liquid solvent developing accomplished by temporarily contacting member 10 with a solvent for softenable layer 12, for example by immersing member 10 in container 23 containing a liquid solvent 24 for layer 12.

It should be understood that although preferred in many instances, because of the high contrast images, with no or low background which result from simple, direct liquid solvent wash away development; as described in aforementioned copending application 460,377 (now U.S. Pat. 3,520,681) and 483,675, and in application Ser. No. 612,122, filed Jan. 27, 1967, now abandoned, development of the imaging members hereof may also be accomplished by softening the softenable layer, for example, with solvent vapor or heat or combinations thereof, or quick dips in liquids to cause softenable layer swelling to cause migration of imagewise non-illuminated portions of fracturable materials, and although layer 12 and unmigrated areas of fracturable material (usually by this invention the imagewise illuminated areas) are not thereby washed away, the image produced may still be directly viewable and in transmission. Readout may also be by means of appropriate sensing means that can detect the selective displacement of particles. For example, magnetic sensing means may be used in conjunction with a layer 13 having a magnetic component.

Figure 7:
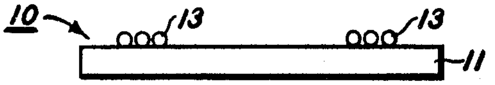
FIG. 7 is a cross section of the imaging member of FIG. 1 after processing according to the invention.

Moreover, a liquid solvent may at any time thereafter be applied to such an image to convert it into a solvent washaway image as illustrated in FIG. 7. In this regard, it is further noted that the liquid solvent applied in this washaway step need not be insulating, conductive liquids may be used. It has also been found that nonmigrated background areas of fracturable material of such a migration image may be removed by abrasion to yield a readily visible image, or the illuminated areas may be adhesively stripped off to yield complementary positive and negative images.

In heat and/or solvent vapor modes of development, the imagewise nonilluminated fracturable material migrates as in the liquid solvent development mode, but in heat and/or solvent vapor development depending on how far the fracturable material migrates towards the substrate, the resulting optical image may be a negative or a positive of a positive original but will be the reverse of what the optical image would have been in the conventional processing mode of uniform charge, imagewise exposure and development.

If solvent liquid development is used, in direct contrast to the teaching of aforementioned copending application Ser. No. 460,377, now U.S. Pat. 3,520,681, the effect of the liquid solvent developing step, FIG. 6, is to dissolve away layer 12 in imagewise exposed areas and cause layer 13 to be washed away in these areas. In imagewise unexposed areas however, layer 13 does not wash away but migrates to and adheres to support layer 11 which can be withdrawn from container 23 with an image pattern 22 adhering thereon. Image 22 in the form of the letter A is a positive image from a positive original. For example, the original could have been a large black or dark A on a substantially lighter or white background which by this inventive process produces, rather than a negative image as was taught by the prior art, a positive image constituted of portions of layer 13 which migrated to form the A on the background provided by substrate 11, as further shown in cross section in FIG. 7.

Generally, solvent 24 and solvents used for vapor softening herein should preferably be a solvent for layer 12, but not for layers 13 and 11 and should have high enough electrical resistance to prevent the migrating material of layer 13 from losing its charge before migrating. Typical solvents for use with the various materials which may comprise layer 12 include acetone, trichloroethylene, chloroform, ethyl ether, xylene, dioxane, benzene, toluene, cyclohexane, 1,1,1-trichloroethane, pentane, n-heptane, trichlorotrifluoroethane available under the designation Freon 113 from the E. I. du Pont de Nemours and Co. M xylene, carbon tetrachloride, thiophene, diphenyl ether, p-cyamine, cis-2,2-dichloroethylene, nitromethane, N,N-dimethyl formamide, ethanol, ethyl acetate, methyl ethyl ketone, ethylene dichloride, methylene chloride, trans 1,2-dichloroethylene, Super Naphtholite available from Buffalo Solvents and Chemicals and mixtures thereof.

The following examples further specifically define the present inventive positive to positive (negative to negative) imaging system. The parts and percentages are by weight unless otherwise indicated. All exposures are from a tungsten filament light source. The examples below are intended to illustrate various preferred embodiments of the imaging system of this invention.

EXAMPLE I

A member 10 as illustrated in FIG. 1, is prepared by gravure roll coating about a 20% solution of custom synthesized 80/20 mole percent copolymer of styrene and hexylmethacrylate having an intrinsic viscosity of about 0.179 dl./gm., in toluene, on Mylar film having a thin transparent aluminum coating thereover to form a dried softenable layer about 2 microns thick. A particulate layer of selenium about 0.5 mciron in thickness is deposited on layer 12 by the inert gas deposition process as described in application Ser. No. 423,167, now abandoned.

Member 10 is then electrostatically charged in darkness to a positive surface potential of about 100 volts by means of a corona discharge device.

The member is then exposed in the dark to a positive optical image with the exposure in the illuminated areas being about 2.5 f.c.s.

The initial charge on the member is then reduced by uniformly depositing negative charge on the member from a corotron wire passing adjacent the surface of the member to lower the surface potential of the member to about positive 25 volts.

The member is then exposed uniformly at about 5 f.c.s.

The member is then immersed in 1,1,1-trichloroethane for about two seconds and removed. A dense, high resolution i.e., greater than about 100 line pairs/mm., faithful and positive image of the optical image is thereby formed on the aluminized Mylar substrate to form a directly visible image which may also be used as a positive projection transparency.

EXAMPLE II

Example I is followed except that the initial charge on the member is reduced by the uniform negative charging step to a negative surface potential of about 25 volts.

EXAMPLES III AND IV

Examples I and II are followed respectively except that the styrene hexylmethacrylate copolymer softenable layer is replaced by about a 2 micron layer of a petroleum hydrocarbon resin available as Piccopale H-2 from Pennsylvania Industrial Chemical Corp.

EXAMPLE V

Example I is followed except that the member is developed by softening the softenable layer by 1,1,1-trichloroethane vapors by positioning the member above about 100 cc. of the liquid in the bottom of a 2 liter bottle and exposing the member to the vapors for about 3 seconds to produce migration in depth of particles in the imagewise unexposed areas. The migrated particles migrated to or near the substrate. The photosensitive particles in the imagewise exposed areas remain substantially intact.

Although specific components and proportions have been stated in the above description of preferred embodiments of the positive to positive imaging system hereof, other suitable materials as listed herein my be used with similar results. In addition, other materials and other configurations of the imaging member may be provided and variations may be made in the various processing steps to synergize, enhance and otherwise modify the system. For example, various plasticizers, additives, moisture and other "proofing" agents may be added to the softenable materials as desired.

It will be understood that various other changes in the details, materials, step and arrangements of the members which have been herein described and illustrated in order to explain the nature of the invention will occur to and may be made by those skilled in the art upon a reading of this disclosure and such changes are intended to be included within the principle and scope of this invention.

What is claimed is:

1. An imaging method comprising:

(a) providing an imaging member comprising a layer of electrically insulating softenable material containing a layer of electrically photosensitive fracturable material contiguous a surface of said softenable layer and contacting said softenable layer, said softenable material capable of having its resistance to migration of said fracturable material decreased sufficiently to allow migration of said fracturable material in depth in said softenable matreial;

(b) uniformly electrostatically charging said surface of said layer with a charge of said first polarity;

(c) exposing said member to an imagewise pattern of activating electromagnetic radiation; and then after steps (a), (b) and (c);

(d) uniformly electrostatically charging the same surface of said layer with a charge of polarity opposite said first polarity;

(e) uniformly exposing said member to activating electromagnetic radiation; and (f) developing said member by decreasing the resistance of the softenable material to migration of the fracturable material through the softenable material at least sufficient to allow imagewise portions of the fracturable material to migrate in depth in said softenable material.

2. An imaging method according to claim 1 wherein said fracturable layer is from about 0.01 to about 2.0 microns thick and wherein said softenable layer is from about ½ to about 16 microns thick.

3. An imaging method according to claim 2 wherein said softenable layer is from about 1 to about 4 microns thick.

4. The method of claim 1 wherein said imaging member additionally comprises a supporting substrate contacting the surface of said softenable layer spaced apart from the layer of fracturable material.

5. An imaging method according to claim 4 wherein said photosensitive fracturable material is in the form of a layer contiguous the surface of said softenable layer opposite the surface of said softenable layer contacting the supporting substrate.

6. An imaging method according to claim 4 wherein said developing is accomplished by contacting said member with a liquid solvent for said softenable material, said solvent being sufficiently electrically resistant to prevent the fracturable material from losing its charge before migrating.

7. An imaging method according to claim 4 wherein the developing is accomplished by softening the softenable material.

8. An imaging method according to claim 7 wherein said softening is accomplished by heating said softenable material.

9. An imaging method according to claim 7 wherein said softening is accomplished by contacting said softenable material with the vapor of a solvent for said material.

10. An imaging method according to claim 7 wherein said softening is accomplished by contacting a solvent liquid to said material.

11. An imaging method according to claim 4 wherein at least one of the uniform electrostatic charging steps of (b) and (d) comprises ionization charging.

12. An imaging method according to claim 4 wherein said photosensitive fracturable material comprises photoconductive material.

13. An imaging method according to claim 12 wherein said photoconductive material comprises amorphous selenium.

14. An imaging method according to claim 4 wherein said member is uniformly electrostatically charged with a charge of a first polarity to a negative surface potential of magnitude in the range between about 25 and about 150 volts.

15. An imaging method according to claim 4 wherein said member is uniformly electrostatically charged with a charge of a first polarity to a positive surface potential of magnitude in the range between about 100 and about 300 volts.

16. An imaging method according to claim 4 wherein steps (d) and (e) are selectively carried out only at particular surface areas of said imaging member with other areas of said imaging member not being subjected to steps (d) and (e) to produce positive and negative latent images in different surface areas of the same imaging member.

17. An imaging method according to claim 4 wherein the member is charged in step (d) to a surface potential of lower magnitude than that obtained in step (b).

18. An imaging method according to claim 17 wherein the surface potential of lower magnitude is between about 15 and about 60 volts.

19. An imaging method according to claim 18 wherein at least one of the uniform electrostatic charging steps of (b) and (d) comprises ionization charging.

20. An imaging method according to claim 19 wherein the ionization charging comprises corona ionization charging.

21. An imaging method according to claim 19 wherein said uniform exposure is between about 1 and about 10 times the maximum imagewise exposure in illuminated areas.

22. An imaging method according to claim 19 wherein said photosensitive fracturable material comprises photoconductive material.

23. An imaging method according to claim 22 wherein said photoconductive material comprises amorphous selenium.

24. An imaging method according to claim 22 wherein said photoconductive material comprises X-form metal-free phthalocyanine.

References Cited

UNITED STATES PATENTS

| | | | |
|---|---|---|---|
| 2,979,403 | 4/1961 | Giaimo | 96—1 |
| 3,268,331 | 8/1966 | Harper | 96—1 |
| 3,438,706 | 4/1969 | Tanaka et al. | 355—11 |
| 2,817,765 | 12/1957 | Hayford et al. | 250—65 |
| 3,041,167 | 6/1962 | Blakney et al. | 96—1 A |
| 3,656,990 | 8/1965 | Goffe | 96—1 R |
| 3,520,681 | 7/1970 | Goffe | 96—1 R |

OTHER REFERENCES

IBM Technical Disclosure Bulletin, vol. 8, No. 4, September 1965.

CHARLES E. VAN HORN, Primary Examiner